United States Patent [19]

Ichiyanagi et al.

[11] Patent Number: 4,573,908
[45] Date of Patent: Mar. 4, 1986

[54] METHOD AND APPARATUS FOR PRODUCING WHITE CEMENT CLINKER

[75] Inventors: Toshikazu Ichiyanagi, Kumagaya; Kanzaburo Sudo, Saitama; Zenzaburo Kawai, Kumagaya; Shoji Sekine, Niza; Hiroshi Teshigawara, Koshigaya, all of Japan

[73] Assignees: Chichibu Cement Kabushiki Kaisha; Ishikawajima-Harima Jukogyo Kabushiki Kaisha, both of Tokyo, Japan

[21] Appl. No.: 743,498

[22] Filed: Jun. 11, 1985

[30] Foreign Application Priority Data

Jun. 11, 1984 [JP] Japan .................................. 59-118345

[51] Int. Cl.⁴ ........................ F27B 15/00; F27D 15/02
[52] U.S. Cl. ........................................ 432/58; 432/78; 432/85
[58] Field of Search ........................ 432/77, 78, 85, 58, 432/106, 14; 34/57 R, 20

[56] References Cited

U.S. PATENT DOCUMENTS

| | | | |
|---|---|---|---|
| 2,879,983 | 3/1959 | Sylvest | 432/78 |
| 2,933,297 | 4/1960 | Erasmus et al. | 432/79 |
| 3,544,090 | 12/1970 | Peeters | 432/79 |
| 3,692,285 | 9/1972 | Avery | 432/79 |
| 3,922,797 | 12/1975 | Dick | 432/78 |
| 3,976,422 | 8/1976 | Motycynski et al. | 432/58 |
| 4,059,396 | 11/1977 | Dano | 432/78 |
| 4,169,701 | 10/1979 | Katayama et al. | 432/78 |

*Primary Examiner*—Henry C. Yuen

[57] ABSTRACT

According to the present invention, white cement clinker particles are not burned in a rotary kiln and the burned clinker particles are not immersed in the water to be cooled. White cement clinker raw materials are burned in a fluidized bed burning furnace with a fluid bed or a spouted bed and the clinker particles thus burned are reduced with a reducing gas. The clinker particles thus reduced are first cooled with the water which is sprayed over the clinker particles and then further cooled with the air. The white cement clinker raw material particles fed into the fluidized bed burning furnace are burned into clinker particles while forming a fluidized bed and then the clinker particles thus burned drop through a jet injection pipe into a reduction chamber disposed below the burning furnace and are reduced. The clinker particles thus reduced are rapidly cooled to 600°–700° C. with the sprayed water while being isolated from the surrounding atmosphere in a primary cooling chamber and the clinker particles thus cooled are further cooled in a secondary cooling chamber with the air to 100°–150° C.

3 Claims, 1 Drawing Figure

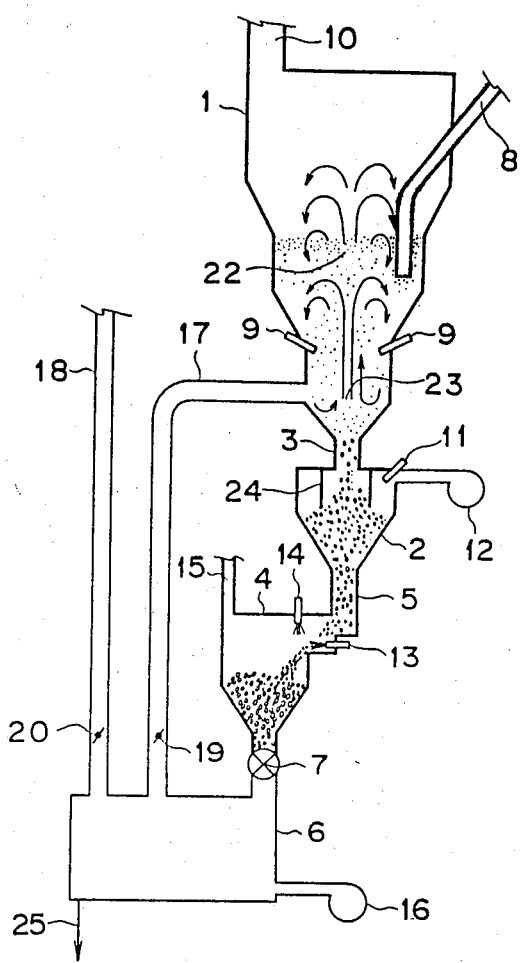

METHOD AND APPARATUS FOR PRODUCING WHITE CEMENT CLINKER

BACKGROUND OF THE INVENTION

The present invention relates to a method and apparatus for producing white cement clinker.

In production of white cement clinker, not only the strength of a final product but also a higher degree of whiteness thereof are demanded. In order to improve the whiteness, apparently raw materials should contain as less iron and manganese as possible; moreover, it is necessary to rapidly cool clinker after clinker is burned in a reducing atmosphere or is first burned in an oxidizing atmosphere and then is subjected to a reduction process by spraying a fuel such as heavy oil. It is well known in the art that rapid cooling of clinker to temperatures below 700° C. must be effected under the condition that the clinker is prevented from contacting with the air; otherwise the clinker would be re-oxidized by oxygen contained in the air.

So far rotary kilns have been used to produce white cement clinker. Clinker discharged from a rotary kiln is immersed in water so as to cool clinker while preventing the same from contacting with the air. Since clinker burned in the rotary kiln has a wide range of particle sizes, clinker cannot be cooled uniformly. If clinker is coarse particle size is immersed in water for a long time to be cooled to temperatures lower than 700° C., much water is needed and clinker in fine particle size is over-cooled. Furthermore the overall temperature of clinker drops too low so that the sensible heat of clinker cannot be used to preheat the combustion air. Moreover, even when clinker has been recovered from the water, the water adheres to clinker so that there arises a problem that the strength of cement is degraded. In addition, a large quantity of steam is produced due the heat exchange between the water and high-temperature clinker and enters the rotary kiln so that the heat consumption of the rotary kiln is increased. On the other hand, when the quantity of water is decreased, clinker in fine particle size is satisfactorily cooled but clinker in coase particle size is not satisfactorily cooled so that when clinker is made into contact with the air, it is oxidized again and consequently its whiteness is degraded. In order to overcome the above-described problems, clinker must be so burned as to have a uniform particle size, but it is impossible to do so when clinker is burned in the rotary kiln. According to a prior art known from Japanese Patent Application laid open under No. 26057/1983, clinker in fine particle size is discharged from a kiln through an annular discharge gap located at a position spaced apart from the discharge end of the kiln by a distance substantially equal to the radius of the kiln and is directed to fall upon an upper part of a conveyor inclined at an angle in a water camber. Clinker in coarse particle size from the discharged end of the kiln is sorted or classified by a sorting or classifying screen such that the coarser the particle size of clinker, the further below clinker is dropped on the conveyor. In other words, the period of time during which clinker in fine particle size is immersed in the water is shorter while the coarser the particle size of clinker, the longer clinker is immersed in the water so that clinker is uniformly cooled. However, the clinker particles cannot be satisfactorily sorted or classified by the discharge gap and the sorting or classifying screen so that there are left much to be improved.

The present invention has for its object to overcome the problem that the prior art methods or processes cannot uniformly cool clinker because burned clinker has a wide range of particle sizes. The present invention also overcomes the problems that the heat consumption of the kilns is increased and that the whiteness is degraded. That it, according to the present invention, relatively fine clinker particles having a narrow particle-size-distribution range can be obtained by burning. Thus, the primary object of the present invention is to provide a method and apparatus for producing white cement clinker which can completely overcome the above and other problems encountered in the prior art methods and apparatus.

BRIEF DESCRIPTION OF THE DRAWINGS

A single FIGURE is a schematic view of an apparatus for carrying out a white cement clinker production method in accordance with the present invention.

DETAILED DESCRIPTION OF THE PREFERRED EMBODIMENT

A single FIGURE shows an apparatus for carrying out a method of the present invention. Reference numeral 1 designates a fluidized burnig furnace for powder of white cement raw materials into clinker; 2, a reduction chamber in which clinker burned in the furnace 1 is subjected to a reduction process; 3, a jet injection pipe interconnecting between the top of the reduction chamber 2 and the bottom of the burning furnace 1, whereby the reducing gas produced in the reduction chamber 2 is forced into the burning furnace 1 as a jet stream of reducing gas; 4, a primary cooling chamber where water is sprayed to cool high-temperature reduced clinker from the reduction chamber 2; 5, a chute interconnecting between the bottom of the reduction chamber 2 and the primary cooling chamber 4; 6, a secondary cooling chamber where cooled clinker from the primary cooling chamber 4 is cooled again with the air; 7, a device such as a rotary feeder interposed between the cooling chambers 4 and 6 for delivering a predetermined quantity of clinker; 8, a raw material feeding pipe; 9, burners of the burning furnace 1; 10, a combustion gas discharge pipe an upper end of which is not shown; 11, a burner in the reduction chamber 2; 12, a fan for feeding the air for partial combution into the reduction chamber 2; 13 and 14, primary-cooling-water spraying devices such as nozzles; 15, a steam discharge pipe for discharging the steam resulting from the water spray into the exterior of the production system; 16, a fan for feeding the cooling air into the second cooling chamber 6; 17 and 18, gas discharge pipes extending from the secondary cooling chamber 6, an upper end of the gas discharge pipe 17 being communicated with the burning furnace 1 while an upper end of the gas discharge pipe 18 being connected to a calcination furnace or chamber not shown; and 19 and 20, dampers for controlling the flow rates of gases discharged through the gas discharge pipes 17 and 18, respectively.

Next the mode of operation of the apparatus with the above-described construction will be described. Powder of white cement raw materials which has been calcined in the calcination furnace or chamber (not shown) is charged through the raw material feeding pipe 8 into a dense layer 22 in the fluidized burning furnace 1. In general, powder of cement raw materials contains a suitable quantity of seed clinker which becomes seeds of clinker particles. The charged particles drop into a dense layer 22 in which the flow rate of gas is higher than a minimum fluidization velocity at which raw material particles are fluidized. As a result, the raw material particles remain in fluidized state in the dense layer 22, thus forming a dense fluidized bed. In the fluidized bed, the flow rate of gas is faster at the center than at the periphery so that a spouted bed is formed. The raw material particles are blown upwards at the center by the gas flows which blow upwards while the raw material particles drop along the periphery. Thus, the raw material particles are circulated.

Seed clinker particles are larger in particle size than the raw material particles so that they pass through the dense layer 22 and reach a thin layer 23 while making in contanct with raw material particles.

As same as the dense layer 22, the thin layer 23 forms a spouted bed, but the flow rate of gas in the thin layer 23 is faster than that in the dense layer 22 so that seed clinker particles are blown upwards by the flow of gas which blows upwards at the center, into the dense layer 22. In the dense layer 22, they contact with the raw material particles and return to the thin layer 23. In the fluidized bed furnace 1, the fuel injected through the nozzles 9 is burned with the air charged through the gas discharge pipe 17 extending from the secondary cooling chamber 6 so that both the dense and thin layers 22 and 23 are constantly maintained at a temperature of about 1,400° C. so that while raw material particles are circulated between the thin and dense layers 23 and 22, they become clinker particles around clinker seeds, growing gradually into the particles 3-5 mm in diameter. The clinker particles thus grown come to have a terminal velocity faster than that of the reducing gas charged through the jet injection pipe 3 from the reduction chamber 2 into the furnace 1 so that they drop through the jet injection pipe 3. The clinker particles in desired particle size can be obtained by controlling the flow rate of the reducing gas flowing through the jet injection pipe 3.

While the clinker particles are dropping through the jet injection pipe 3, they are subjected to reduction by the reducing gas and drop into the reduction chamber 2. The reduction chamber 2 has a cylindrical upper portion and a frustconical lower portion and an inner cylinder 24 which is greater in diamter than the jet injection pipe 3 is disposed. The burner 11 extends through the top of the reduction chamber 2. The fan 12 charges the air into the reduction chamber 2 the quantity of which is not sufficient to completely burn the fuel injected through the nozzle or burner 11, resulting in the incomplete combustion. Therefore, the reducing gas is produced and injected through the jet injection pipe 3 and inner cylinder 24 into the burning furnace 1. The level of the clinker layer in the reduction chamber 2 is maintained between the upper and lower ends of the inner cylinder 24 by controlling the quantity of clinker forcibly discharged through the chute 5 into the primary cooling chamber 4 so that the velocity of the gas flowing through the inner cylinder 24 is made equal to a minimum fluidization velocity at which clinker particles of target particle sizes are started to be fluidized. As a result, the clinker particles are fluidized by the reducing gas within the inner cylinder 24 and are therefore reduced. Clinker particles whose particle sizes are smaller than target particle sizes and raw material particles which have been attached to the clinker particles and are separated to drop due to strong collosion between the clinker particles are blown upwards and entrained by the reducing gas into the fluidized bed in the burning furnace 1. Therefore, the clinker particles are classified by the reducing gas in thw lower portion of the burning furnace 1 and reduction chamber 2 so that relatively fine clinker particles whose particle-size distribution is extremely narrow can be obtained. These clinker particles in fluidized state are made into contact with the reducing gas so that they are uniformly reduced. In this embodiment, the reducing gas is produced in the reduction chamber 2, but it is to be understood that a separate reducing-gas-generating furnace may be provided such that the reducing gas produced in this furnace is charged into the reduction chamber 2.

The clinker particles which have been reduced in the reduction chamber 2 fill the chute 5 and gradually drop. They are forced to be discharged into the primary cooling chamber 4 by the pressure of cooling water injected through the water spray device 13 while being cooled also by the water sprayed through the water spray device 14. It is to be understood that any other suitable rotary or reciprocal mechanical means may be used to forcibly discharge the clinker particles from the chute 5 into the primary cooling chamber 4.

In the primary cooling chamber 4, the particle size distribution of clinker particles is extremely narrow and the clinker particles have relatively fine particle sizes so that they can be uniformly cooled. The sprayed water is instanteneously evaporated into the high temperature superheated steam which fills the primary cooling chamber 4. As a result, the clinker particles are isolated from the surrounding atmosphere so that they are prevented from making into contact with the air and from being oxidized. The pressure in the primary cooling chamber 4 becomes high so that the steam is discharged through the steam discharge pipe 15 into the exterior of the system. In order to prevent the reducing gas which is produced in the reduction chamber 2 from flowing through the chute 5 into the primary cooling chamber 4, the quantity of steam to be discharged is so controlled that the pressure in the primary cooling chamber 4 is balanced with that in the reduction chamber 2.

In the primary cooling chamber 4, the water is sprayed so that the high-temperature clinker particles are rapidly cooled to 600°–700° C. The clinker particles thus cooled is discharged by the rotary feeder 7 into the secondary cooling chamber 6. The air is charged from the fan 16 into the secondary cooling chamber 6 so that the clinker particles are further cooled to 100°–150° C. and then they are discharged through a clinker discharge port 25. As described above, the clinker particles are already cooled to 600°–700° C. before they are charged into the secondary cooling chamber 6 so that even when they are cooled with the air in the secondary cooling chamber 6, they are prevented from being oxidized. The air in the secondary cooling chamber 6 which is heated by the clinker particles is discharged through the discharge pipe 17 into the burning furnace 1 as the combustion air. The air discharged through the gas discharge pipe 18 is fed into the calcination furnace (not shown) as the combustion air.

As described above, according to the present invention, the clinker particles are burned in the fluidized bed burning furnace, not in a rotary kiln, so that white cement clinker particles in uniform particle size can be obtained. That is, relatively fine clinker particles whose particle-size-distribution is extremely narrow can be obtained. Furthermore, according to the present invention, the clinker particles are reduced by the reducing gas and then cooled first by the sprayed water and then by the air. That is, the clinker particles are not immersed in the water. More specifically, according to the present invention, the water is sprayed in the primary cooling chamber so that the clinker particles are first cooled to 600°–700° C. and consequently the steam is produced instantaneously and fills the primary cooling chamber 6. As a result, the clinker particles are rapidly cooled while being isolated from the surrounding atmosphere so that they are prevented from being oxidized. As a result, they are uniformly cooled and have a higher degree of whiteness. In addition, the quantity of water used can be reduced. After the clinker particles have been cooled to 600°–700° C. in the primary cooling chamber, they are charged into the second cooling chamber and cooled with the air so that they are prevented from being oxidized in the secondary cooling chamber. Furthermore, the air which is heated due to the heat exchange with the clinker particles can be used as the combustion air so that the sensitive heat of clinker particles can be effectively utilized.

An apparatus for producing white cement clinker in accordance with the present invention comprises a fluidized bed burning furnace for burning white cement raw material particles into clinker particles, a reduction chamber in which high temperature clinker particles are reduced with the reducing gas resulting from the incomplete combustion of a fuel, a primary cooling chamber in which the water is sprayed over the clinker particles so that the latter are cooled to 600°–700° C. and a secondary cooling chamber in which the clinker particles are further cooled with the air. Therefore, the above-described white cement clinker production method in accordance with the present invention can be completely carried out. Furthermore, the reduction chamber is located below the fluidized bed burning furnace and they are intercommunicated with each other through a jet injection pipe so that the reducing gas produced in the reduction chamber rises through the jet injection pipe to be blown upwards from the bottom of the fluidized bed burning furnace into the interior thereof so that the reducing gas functions as a gas for calssifying clinker particles and is effectively used as a fuel burned in the fluidized bed burning furnace.

What is claimed is:

1. An apparatus for producing white cement clinker comprising a fluidized bed burning furnace for burning white cement raw material particles into clinker particles, a reduction chamber below said burning furnace for reducing the clinker particles from said burning furnace, a jet injection pipe intercommunicating between a top of said reduction chamber and a bottom of said burning furnace a primary cooling chamber communicated with said reduction chamber for cooling the clinker particles from said reduction chamber by spraying water and a secondary cooling chamber communicated with said primary cooling chamber, through means for feeding a predetermined quantity of clinker particles, for further cooling the cooled clinker particles from said primary cooling chamber with the air.

2. An apparatus according to claim 1 wherein a fuel is injected into said reduction chamber and is incompletely burned.

3. An apparatus according to claim 1 wherein a reducing-gas generating furnace is provided seperately such that reducing gas produced in said reducing-gas generating furnace is charged into said reduction chamber.

* * * * *